United States Patent
Lee

(10) Patent No.: US 9,960,403 B2
(45) Date of Patent: May 1, 2018

(54) BATTERY MODULE ASSEMBLY HAVING COMMUNICATION TERMINALS OF BMS PROTRUDING FROM FRONT THEREOF

(71) Applicant: LG CHEM, LTD., Seoul (KR)

(72) Inventor: Bum Hyun Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 75 days.

(21) Appl. No.: 14/908,323

(22) PCT Filed: Aug. 21, 2014

(86) PCT No.: PCT/KR2014/007766
§ 371 (c)(1),
(2) Date: Jan. 28, 2016

(87) PCT Pub. No.: WO2015/026175
PCT Pub. Date: Feb. 26, 2015

(65) Prior Publication Data
US 2016/0172654 A1 Jun. 16, 2016

(30) Foreign Application Priority Data
Aug. 23, 2013 (KR) .................. 10-2013-0100188

(51) Int. Cl.
*H01M 2/30* (2006.01)
*H01M 2/10* (2006.01)
(Continued)

(52) U.S. Cl.
CPC ........... *H01M 2/30* (2013.01); *B60L 11/1879* (2013.01); *H01M 2/0262* (2013.01);
(Continued)

(58) Field of Classification Search
None
See application file for complete search history.

(56) References Cited

U.S. PATENT DOCUMENTS

2003/0054239 A1* 3/2003 Watanabe ........... H01M 2/1072
429/152
2005/0285567 A1 12/2005 Kim
(Continued)

FOREIGN PATENT DOCUMENTS

EP 2833440 A1 2/2015
JP 2012-239379 A 12/2012
(Continued)

OTHER PUBLICATIONS

International Search Report, issued in PCT/KR2014/007766, dated Dec. 19, 2014.

*Primary Examiner* — Wojciech Haske
(74) *Attorney, Agent, or Firm* — Birch, Stewart, Kolasch & Birch, LLP

(57) ABSTRACT

A battery module assembly has unit modules, each unit module having unit cells loaded on a cartridge with the unit cells are electrically connected to each other via busbars. The battery module assembly includes two or more sub-modules arranged in a lateral direction while being spaced apart from each other, each of the sub-modules including two or more unit modules stacked in a height direction from the ground. A battery management system (BMS) mounted between the sub-modules, the BMS being provided at one side thereof with communication terminals, a base plate, side cover plates, a top cover plate and a front cover plate mounted at fronts of the sub-modules. The front cover is coupled to the sub-modules, the base plate, and the side cover plates, the front cover plate being provided with through holes, through which the communication terminals are exposed.

14 Claims, 7 Drawing Sheets

(51) Int. Cl.
   *H01M 2/20*    (2006.01)
   *H01M 10/42*   (2006.01)
   *H01M 2/02*    (2006.01)
   *B60L 11/18*   (2006.01)
   *H01M 10/052*  (2010.01)

(52) U.S. Cl.
   CPC ....... *H01M 2/0287* (2013.01); *H01M 2/1077* (2013.01); *H01M 2/206* (2013.01); *H01M 10/052* (2013.01); *H01M 10/425* (2013.01); *H01M 2010/4271* (2013.01); *H01M 2220/10* (2013.01); *H01M 2220/20* (2013.01); *Y02T 10/7005* (2013.01); *Y02T 10/705* (2013.01); *Y02T 90/16* (2013.01)

(56) References Cited

U.S. PATENT DOCUMENTS

| | | | |
|---|---|---|---|
| 2009/0208828 A1* | 8/2009 | Kanai | H01G 9/12 429/120 |
| 2010/0019732 A1 | 1/2010 | Utsumi et al. | |
| 2010/0247979 A1 | 9/2010 | Ha et al. | |
| 2011/0135994 A1 | 6/2011 | Yang et al. | |
| 2011/0297467 A1* | 12/2011 | Iwasa | B60K 1/04 180/65.31 |
| 2013/0065087 A1 | 3/2013 | Kim et al. | |
| 2013/0143082 A1 | 6/2013 | Kim | |

FOREIGN PATENT DOCUMENTS

| | | |
|---|---|---|
| KR | 10-2005-0123483 A | 12/2005 |
| KR | 10-2009-0010426 A | 1/2009 |
| KR | 10-2010-0097504 A | 9/2010 |
| KR | 10-2012-0074421 A | 7/2012 |
| KR | 10-2013-0027993 A | 3/2013 |
| KR | 10-2013-0073582 A | 7/2013 |

* cited by examiner

【FIG. 1】
10
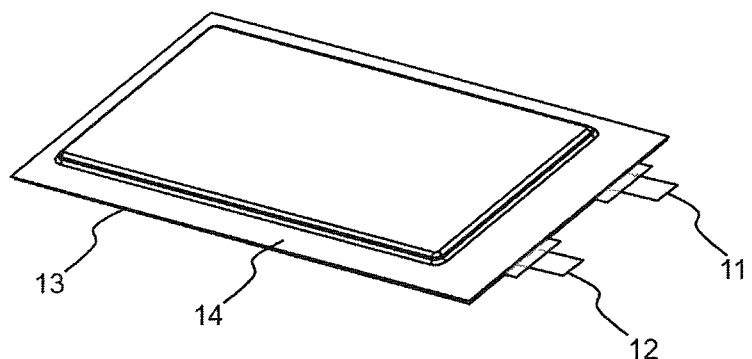
【FIG. 2】
110
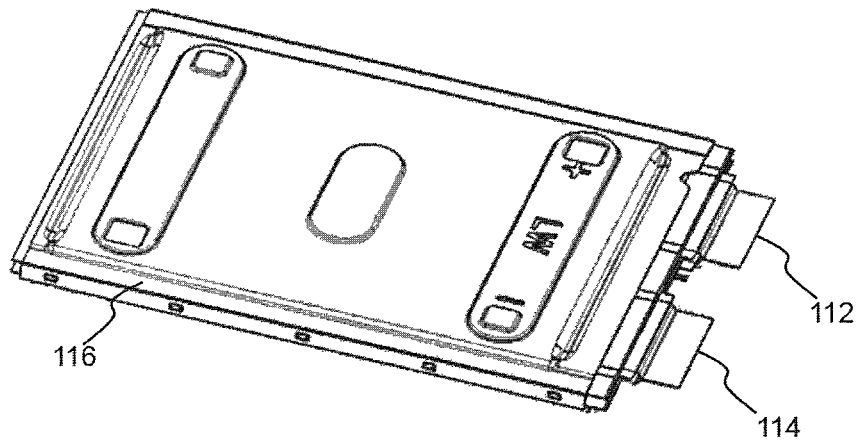

[FIG. 3]
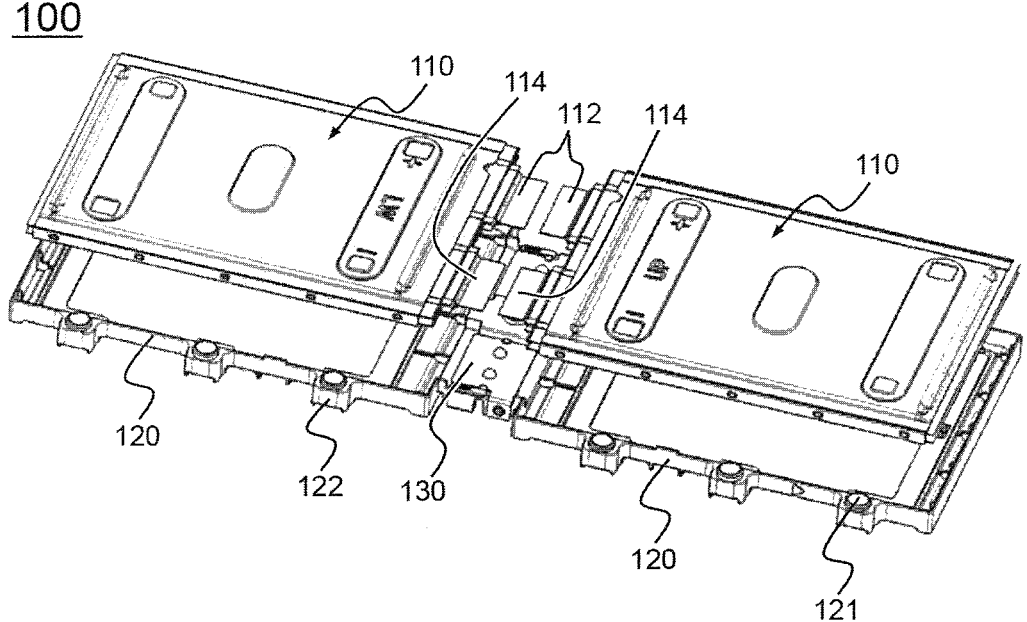

【FIG. 4】
200
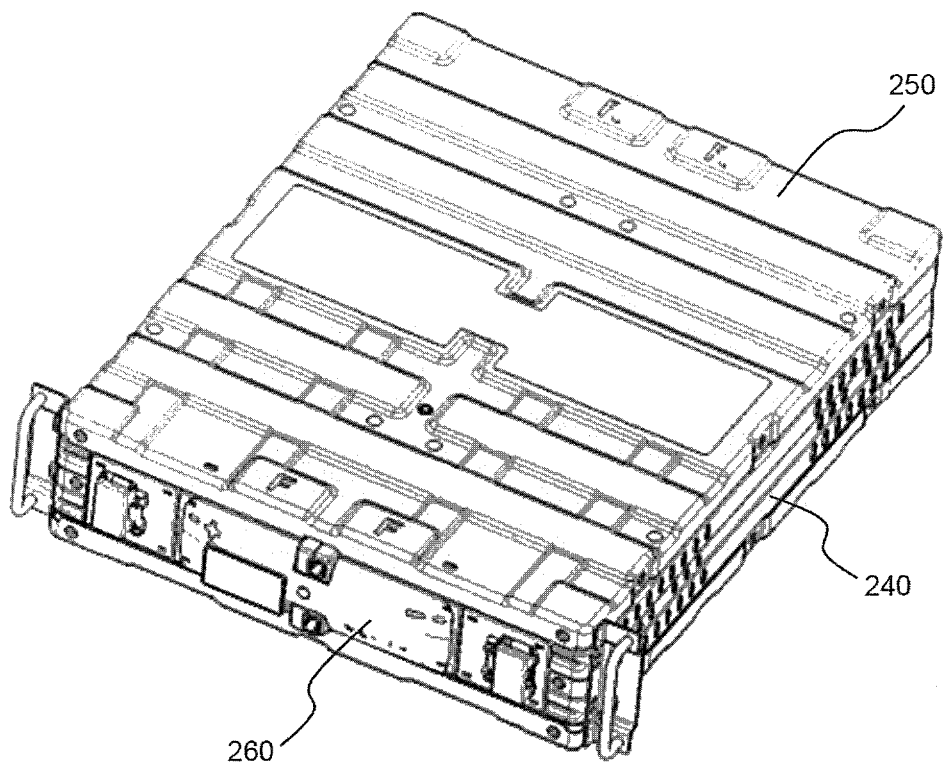

【FIG. 5】
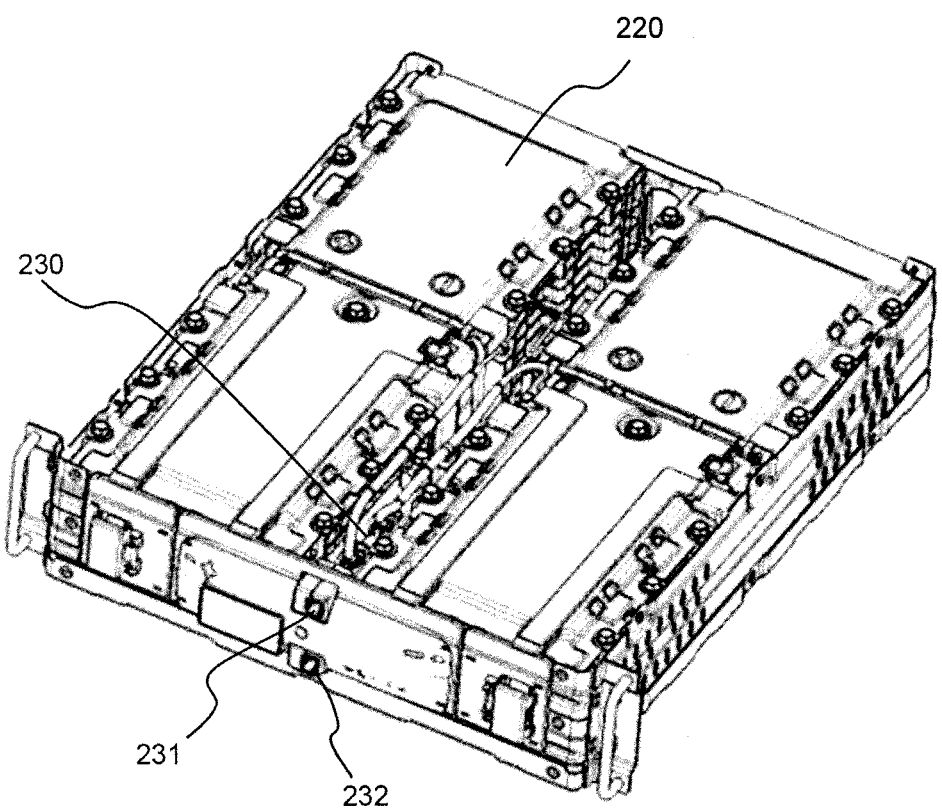

[FIG. 6]
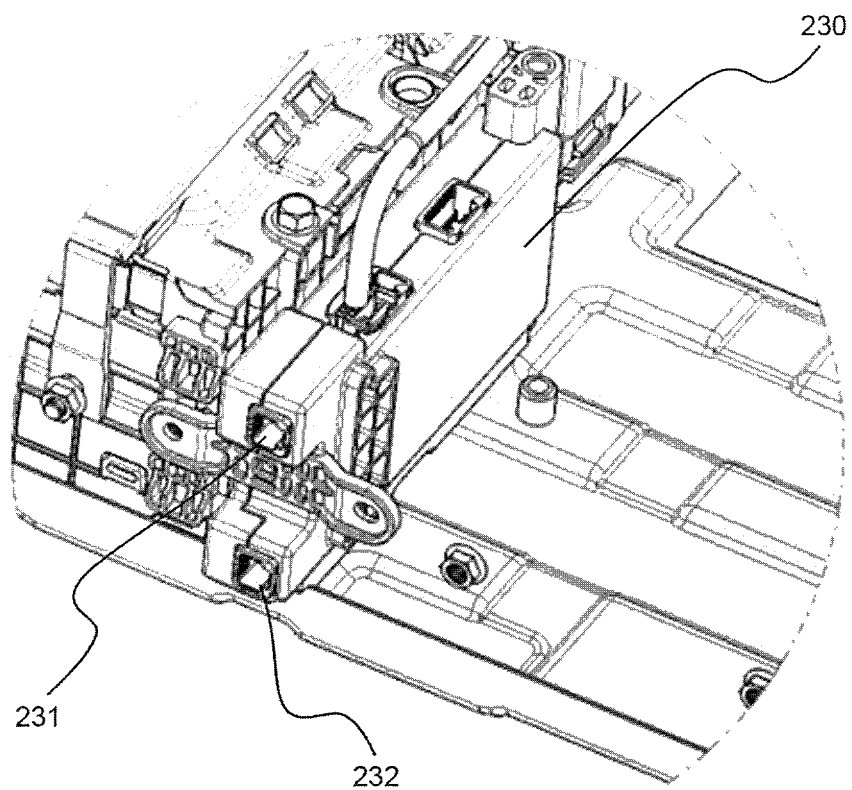

[FIG. 7]
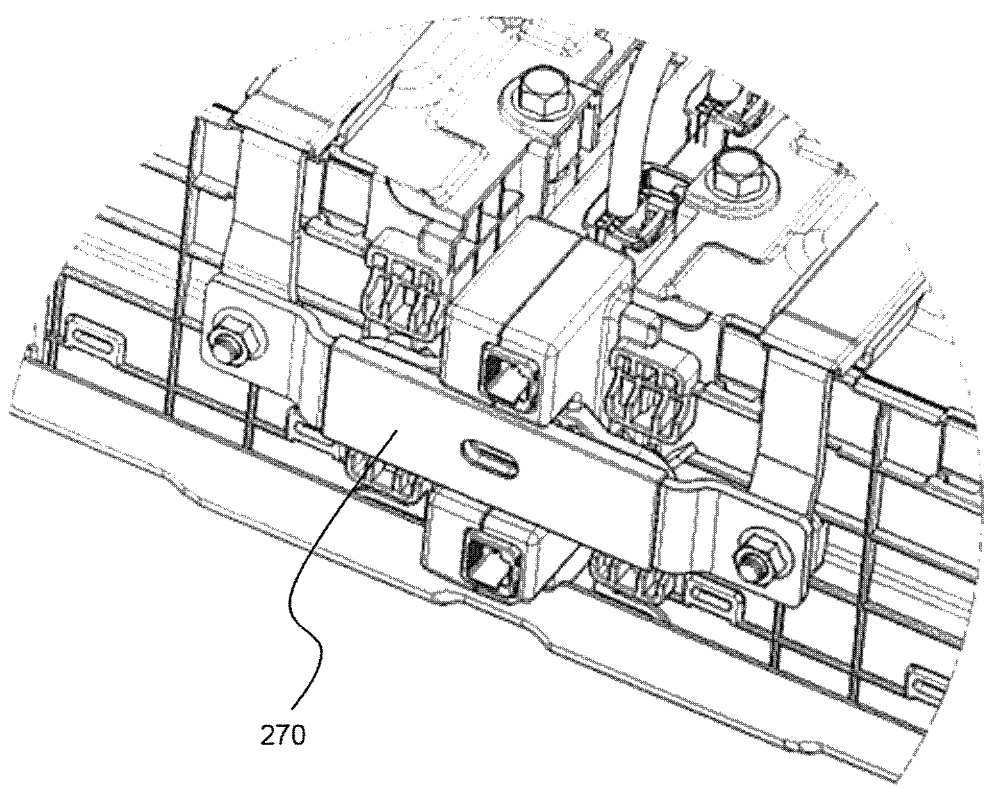

[FIG. 8]
300
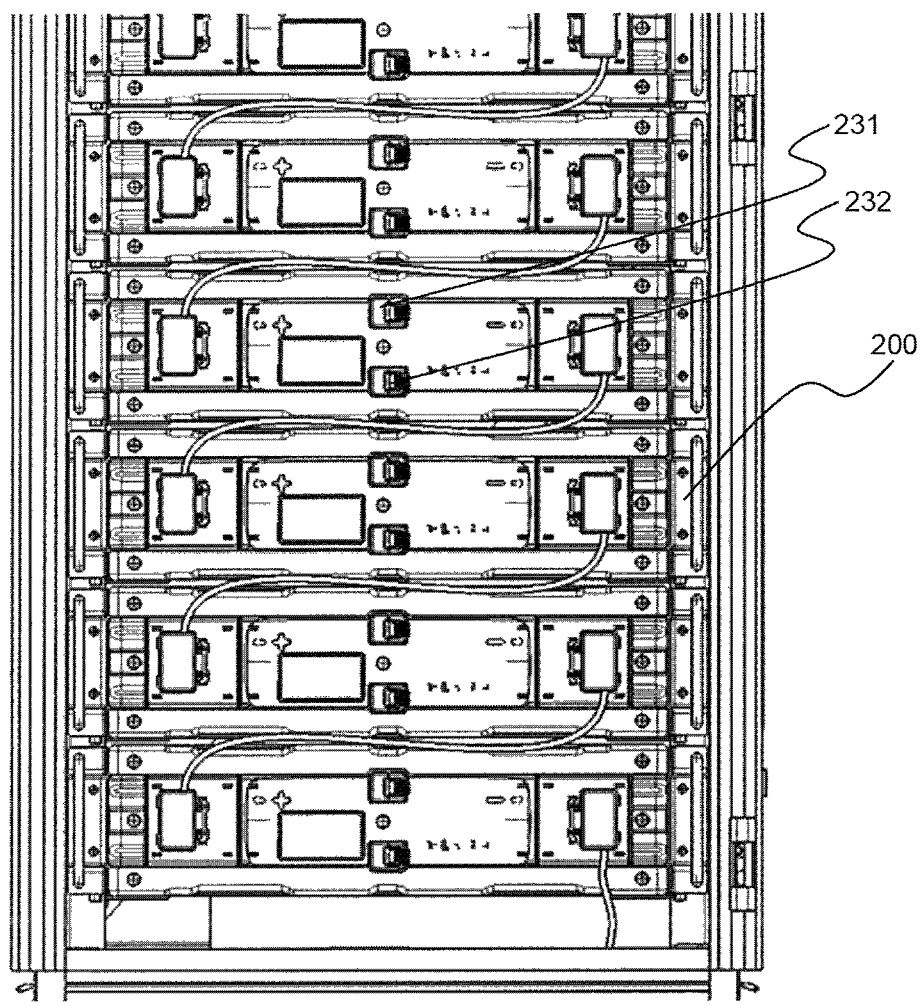

BATTERY MODULE ASSEMBLY HAVING COMMUNICATION TERMINALS OF BMS PROTRUDING FROM FRONT THEREOF

TECHNICAL FIELD

The present invention relates to a battery module assembly having communication terminals of a battery management system (BMS) protruding from the front thereof.

BACKGROUND ART

In recent years, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

In addition, technology related to a power storage apparatus that stores electric power and stably supplies the stored electric power to a power system when needed has been developed. The power storage apparatus is an apparatus that stores electric power when power demand is low and supplies the stored electric power in case of overload or emergency. The power storage apparatus provides the effect of improving quality of electric power and energy efficiency. In particular, a market for a household power storage apparatus and a middle-sized industrial or commercial power storage apparatus has been rapidly expanding as the power storage apparatuses are related to smart grid technology.

Meanwhile, for a battery module to provide output and capacity required by a predetermined apparatus or device, it is necessary for the battery module to be configured to have a structure in which a plurality of battery cells is electrically connected to each other in series or in parallel. In addition, it is necessary for the battery module to be configured to have a structure which is easily extendable and stable as the capacity of the battery module is increased.

Particularly, in a case in which a plurality of battery cells is used to constitute a battery module, overvoltage may be applied to some of the battery cells, overcurrent may flow in some of the battery cells, or some of the battery cells may overheat, with the result that safety and operation efficiency of the battery module may be seriously concerned. For this reason, it is necessary to provide a means for detecting such overvoltage, overcurrent, or the overheating to control the battery module. Consequently, the battery module includes a safety system, such as a battery management system (BMS), which detects such overvoltage, overcurrent, or the overheating to control and protect the battery module.

A plurality of battery modules is stacked to constitute a battery pack having high capacity and high output. A sub BMS included in each of the battery modules must be connected to a main BMS of the battery pack via communication terminals so as to control each of the battery modules. Since the sub BMS is mounted in each of the battery modules, however, it is difficult to interconnect the communication terminals.

Therefore, there is a high necessity for technology that is capable of fundamentally solving the above problems.

DISCLOSURE

Technical Problem

The present invention has been made to solve the above problems, and other technical problems that have yet to be resolved.

It is an object of the present invention to provide a battery module assembly configured to have a structure in which a communication unit is easily extended and connected between battery modules.

Technical Solution

In accordance with one aspect of the present invention, the above and other objects can be accomplished by the provision of a battery module assembly having unit modules, each of which is configured to have a structure in which unit cells are loaded on a cartridge in a state in which the unit cells are electrically connected to each other via busbars, the battery module assembly including two or more sub-modules arranged in a lateral direction while being spaced apart from each other, each of the sub-modules including two or more unit modules that are stacked in a height direction from the ground, a battery management system (BMS) mounted in a space defined between the sub-modules, the BMS being provided at one side thereof with communication terminals, a base plate on which the sub-modules and the BMS are loaded, side cover plates mounted at sides of the sub-modules, a top cover plate loaded on top surfaces of the sub-modules, the top cover plate being coupled to the sub-modules and to the side cover plates by fastening, and a front cover plate mounted at fronts of the sub-modules, the front cover plate being coupled to the sub-modules, the base plate, and the side cover plates, the front cover plate being provided with through holes, through which the communication terminals are exposed.

That is, the battery module assembly according to the present invention is configured to have a structure in which the communication terminals of the BMS are mounted to the front cover plate in a state of being exposed from the front cover plate, whereby a communication unit can be easily extended and connected between battery module assemblies.

Specifically, the communication terminals protrude from the front cover plate through the through holes formed at the front cover plate.

In a concrete example, each of the unit cells may be a single plate-shaped battery cell, or may be configured to have a structure in which two or more plate-shaped battery cells are mounted in a cell cover in a state in which electrode terminals are exposed.

For example, the plate-shaped battery cell may be configured to have a structure in which an electrode assembly is mounted in a battery case made of a laminate sheet including a metal layer and a resin layer, and the outer edge of the battery case is sealed.

The battery cell is not particularly restricted so long as the battery cell is capable of providing high voltage and high current when a battery module assembly or a battery pack is manufactured using the battery cell. For example, the battery cell may be a lithium secondary battery having a large amount of energy storage per volume.

In another example of each of the unit cells, the cell cover may include a pair of sheathing members coupled to each other for covering outer surfaces of the battery cells excluding the electrode terminals. For example, two battery cells may be mounted in the cell cover, and the two battery cells may be stacked in the cell cover such that electrode tabs having the same polarities are connected in parallel to each other while being adjacent to each other.

In a concrete example, the unit cells of each of the unit modules may be connected in parallel to each other.

Specifically, the unit cells may be mounted on the cartridge such that electrode terminals are opposite to each other, and the electrode terminals may be connected in parallel to each other via busbars mounted at the cartridge.

The cartridge, which is an electrically insulative member exhibiting predetermined rigidity, protects the unit cells from external impact and ensures stable mounting of the unit cells. In addition, the unit cells are aranges such that the electrode terminals of the unit cells are opposite to each other due to the cartridge, whereby electrical parallel connection between the unit cells via the busbars is more easily achieved.

The cartridge may be provided at opposite sides thereof with protrusions, each of which has a fastening hole, and cartridges may be coupled to each other so as to constitute each of the sub-modules by inserting cartridge fastening members through the fastening holes. Consequently, the unit cells may be fixed by the cartridge and, at the same time, the cartridges may be fastened to each other by coupling through the fastening holes. Consequently, it is possible to achieve a more secure and stable fixing effect. The cartridges may be fastened to each other, for example, by inserting bolts or rivets through the fastening holes. However, the present invention is not limited thereto.

The unit modules of each of the sub-modules are connected in series and/or parallel to each other.

In a concrete example, the BMS, which controls the operation of the battery module, may be configured to have a hexahedral structure, and the communication terminals may protrude from the upper end and the lower end of one surface of the hexahedral structure.

The sub-modules may be electrically and mechanically connected to each other via a sub-module fastening member, the sub-module fastening member may extend between the upper communication terminal and the lower communication terminal of the BMS, and one surface of the BMS at which the sub-module fastening member extends may be depressed such that the sub-module fastening member is mounted in the depression. One surface of the BMS at which the sub-module fastening member extends may be made of an insulative material.

In accordance with another aspect of the present invention, there is provided a battery pack including the battery module assembly.

The battery pack may be manufactured by combining battery modules as unit modules according to desired output and capacity. In consideration of installation efficiency and structural stability, the battery pack may be used as a power source for a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle. However, the present invention is not limited thereto.

In accordance with a further aspect of the present invention, there is provided a device including the battery pack as a power source. Specifically, the device may be a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view showing a battery cell constituting a unit cell of a unit module according to the present invention;

FIG. 2 is a perspective view showing a unit cell constituted by the battery cell of FIG. 1;

FIG. 3 is a perspective view showing a unit module constituted by unit cells, one of which is shown in FIG. 2;

FIG. 4 is a perspective view showing a battery module assembly according to an embodiment of the present invention;

FIG. 5 is a perspective view showing the battery module assembly of FIG. 4 with a top cover plate removed;

FIG. 6 is a perspective view showing a battery management system (BMS) according to an embodiment of the present invention;

FIG. 7 is a perspective view showing a structure in which the BMS is fastened to sub-modules according to an embodiment of the present invention; and FIG. 8 is a front view showing a battery pack according to an embodiment of the present invention.

BEST MODE

Now, exemplary embodiments of the present invention will be described in detail with reference to the accompanying drawings. It should be noted, however, that the scope of the present invention is not limited by the illustrated embodiments.

FIG. 1 is a perspective view showing a battery cell constituting a unit cell of a unit module according to the present invention, FIG. 2 is a perspective view showing a unit cell constituted by the battery cell of FIG. 1, and FIG. 3 is a perspective view showing a unit module constituted by unit cells, one of which is shown in FIG. 2.

Referring to FIGS. 1 to 3, a battery cell 10 is configured to have a structure in which an electrode assembly (not shown) is received in a battery case 13 made of a laminate sheet together with an electrolyte (not shown), and an outer edge 14 of the battery case is sealed. Electrode tabs 11 and 12 are formed at one side of the battery case 13.

A unit cell 110 is configured to have a structure in which two plate-shaped battery cells 10 are mounted in a cell cover 116 in a state in which electrode terminals 112 and 114 are exposed from one side of the cell cover 116. The cell cover 116 of the unit cell includes a pair of sheathing members coupled to each other for covering outer surfaces of the battery cells 10 excluding the electrode terminals 112 and 114. The battery cells 10 are stacked in the cell cover 116 such that electrode tabs 11 and 12 having the same polarities are connected in parallel to each other while being adjacent to each other.

A unit module 100 is configured to have a structure in which the unit cells 110 are mounted on a cartridge 120 such that the electrode terminals 112 and 114 are opposite to each other, and the electrode terminals 112 and 114 are electrically connected in parallel to each other via busbars 130.

Protrusions 122, each of which has a fastening hole 121, are formed at the side of the cartridge 120.

FIG. 4 is a perspective view showing a battery module assembly according to an embodiment of the present invention, and FIG. 5 is a perspective view showing the battery module assembly of FIG. 4 with a top cover plate removed.

Referring to FIGS. 4 and 5 together with FIG. 3, a battery module assembly 200 includes sub-modules 220, a battery management system (BMS) 230, a base plate (not shown), side cover plates 240, a top cover plate 250, and a front cover plate 260.

Each of the sub-modules 220 is configured to have a structure in which unit modules 100 are stacked in a height direction from the ground, and cartridges 120 are coupled to each other by inserting cartridge fastening members (not shown) through fastening holes 121 of the cartridges 120. In addition, the sub-modules 220 are loaded on the base plate in a state in which the sub-modules 220 are arranged in a lateral direction while being spaced apart from each other.

The side cover plates 240 are mounted at the sides of the sub-modules 220, and the top cover plate 250 is loaded on the top surfaces of the sub-modules 220. The top cover plate 250 is coupled to the sub-modules 220 and to the side cover plates 240.

The BMS 230 is mounted in a space defined between the sub-modules 220. Communication terminals 231 and 232 are formed at one side of the BMS 230. Through holes (not shown) are formed at the front cover plate 260 such that the communication terminals 231 and 232 of the BMS 230 protrude through the through holes of the front cover plate 260.

FIG. 6 is a perspective view showing a BMS according to an embodiment of the present invention, and FIG. 7 is a perspective view showing a structure in which the BMS is fastened to sub-modules according to an embodiment of the present invention.

Referring to FIGS. 6 and 7, the BMS 230 is configured to have a hexahedral structure. An upper communication terminal 231 and a lower communication terminal 232 are formed at the upper and the lower end of one surface of the BMS 230. The sub-modules 220 are electrically and mechanically connected to each other via a sub-module fastening member 270. The sub-module fastening member 270 extends between the upper communication terminal 231 and the lower communication terminal 232 of the BMS 230. The surface of the BMS 230 at which the communication terminals 231 and 232 are formed is configured to have a structure in which a portion of the BMS 230 between the upper communication terminal 231 and the lower communication terminal 232 is depressed such that the sub-module fastening member 270 is mounted in the depressed portion of the BMS 230.

FIG. 8 is a front view showing a battery pack according to an embodiment of the present invention.

Referring to FIG. 8, a battery pack 300 includes a plurality of stacked battery module assemblies 200. Communication terminals 231 and 232 formed at the middles of the battery module assemblies 200 in a protruding state are connected to each other in a daisy chain mode.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery module assembly according to the present invention is configured to have a structure in which communication terminals of a battery management system (BMS) are mounted to a front cover plate in a state of being exposed from the front cover plate, whereby a communication unit can be easily extended and connected between battery module assemblies.

The invention claimed is:

1. A battery module assembly having unit modules, each of which is configured to have a structure in which unit cells are loaded on a cartridge in a state in which the unit cells are electrically connected to each other via busbars, the battery module assembly comprising:
    two or more sub-modules arranged in a lateral direction while being spaced apart from each other, each of the sub-modules comprising two or more unit modules that are stacked in a height direction from a ground;
    a battery management system (BMS) mounted in a space defined between the sub-modules, the BMS being provided at one side thereof with communication terminals;
    a base plate on which the sub-modules and the BMS are loaded;
    side cover plates mounted at sides of the sub-modules;
    a top cover plate loaded on top surfaces of the sub-modules, the top cover plate being coupled to the sub-modules and to the side cover plates by fastening; and
    a front cover plate mounted at fronts of the sub-modules, the front cover plate being coupled to the sub-modules, the base plate, and the side cover plates, the front cover plate being provided with through holes, through which the communication terminals are exposed,
    wherein the sub-modules are connected to each other via a sub-module fastening member, the sub-module fastening member extends between an upper communication terminal and a lower communication terminal of the BMS, and one surface of the BMS at which the sub-module fastening member extends is depressed such that the sub-module fastening member is mounted in the depression.

2. The battery module assembly according to claim 1, wherein the communication terminals protrude from the front cover plate through the through holes.

3. The battery module assembly according to claim 1, wherein each of the unit cells is a single plate-shaped battery cell, or is configured to have a structure in which two or more plate-shaped battery cells are mounted in a cell cover in a state in which electrode terminals are exposed.

4. The battery module assembly according to claim 3, wherein the plate-shaped battery cell is configured to have a structure in which an electrode assembly is mounted in a battery case made of a laminate sheet comprising a metal layer and a resin layer, and an outer edge of the battery case is sealed.

5. The battery module assembly according to claim 3, wherein the plate-shaped battery cell is a lithium secondary battery.

6. The battery module assembly according to claim 3, wherein the cell cover comprises a pair of sheathing members coupled to each other for covering outer surfaces of the battery cells excluding the electrode terminals.

7. The battery module assembly according to claim 1, wherein the unit cells of each of the unit modules are connected in parallel to each other.

8. The battery module assembly according to claim 7, wherein the unit cells are mounted on the cartridge such that electrode terminals are opposite to each other, and the electrode terminals are connected in parallel to each other via busbars mounted at the cartridge.

9. The battery module assembly according to claim 1, wherein the cartridge is provided at opposite sides thereof with protrusions, each of which has a fastening hole, and cartridges are coupled to each other so as to constitute each of the sub-modules by inserting cartridge fastening members through the fastening holes.

10. The battery module assembly according to claim 1, wherein the unit modules of each of the sub-modules are connected in series to each other.

11. The battery module assembly according to claim 1, wherein the BMS is configured to have a hexahedral structure, and the communication terminals protrude from an upper end and a lower end of one surface of the hexahedral structure.

12. A battery pack comprising a battery module assembly according to claim 1.

13. A device comprising a battery pack according to claim 12.

14. The device according to claim 13, wherein the device is a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle.

\* \* \* \* \*